United States Patent Office 3,532,705
Patented Oct. 6, 1970

3,532,705
ACETOXYMETHYL-2-PHENYLTHIAZOL-4-YLACETATE
John Frederick Cavalla, Middlesex, and Kevan Brown, Woodley, England, assignors, by mesne assignments, to John Wyeth & Brother Limited, Taplow, Maidenhead, England, a British company
No Drawing. Filed Nov. 2, 1967, Ser. No. 680,039
Claims priority, application Great Britain, May 4, 1967, 20,700/67
Int. Cl. C07d 91/32
U.S. Cl. 260—302          1 Claim

ABSTRACT OF THE DISCLOSURE

Acetoxymethyl 2-phenylthiazol-4-ylacetate,

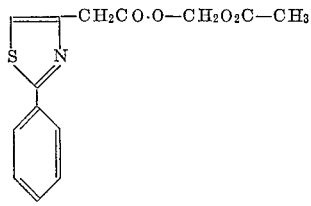

has been found to exhibit valuable antiinflammatory activity without serious side-effects, and can therefore be used in therapy for treatment of inflammation in mammals. Preparation of the subject compound is described.

---

This invention relates to the acetoxymethyl ester of 2-phenylthiazol-4-acetic acid.

This compound has been found to possess surprising antiinflammatory properties, and can therefore be used in pharmaceutical compositions preferably for administration orally or by injection, though also for topical administration if mixed with an appropriate solid or sterile liquid carrier or with a cream or ointment base.

2-phenylthiazol-4-ylacetic acid is known from Rec. Trav. Chim., 49, 1066–8, but no specific pharmaceutical activity is there mentioned for this compound or its derivatives; we have surprisingly found that this particular ester derivative exhibits especially good antiinflammatory activity when tested on laboratory animals. Furthermore, unlike many antiinflammatory agents in use at present, the subject compound shows very little ulcerogenic activity or sedative action. This relative freedom undesirable side-effects enhances its value as a therapeutic agent for the relief of mammals suffering from inflammation.

Examples of such tests which can indicate that a compound has antiinflammatory activity are those described by Winter et al. in Proc. Soc. Exp. Biol. Med. 111, 544 (1962); Buttle et al. in Nature 179, 629 (1957); Konzett and Rossler in Arch. Exp. Path. Pharmac. 195, 71 (1940) and Newbould in Brit. Journ. Pharm. Chemoth. 21, 127–136 (1963).

When preparing a pharmaceutical composition any suitable pharmaceutical carrier known in the art can be used, the particular carrier depending on the chosen route of administration and usual pharmaceutical practice. The carrier may be a solid or sterile liquid or a mixture of more than one carrier, e.g., a cream.

The following nonlimiting example illustrates the invention.

EXAMPLE

Symmetrical dichloroacetone (25.4 g., 0.2 mole) and thiobenzamide (27.4 g., 0.2 mole) were dissolved separately in the minimum quantity of acetone, the solutions were mixed and left at room temperature overnight. The crystalline product (46.2 g.) was filtered off, washed with acetone and dried.

This product was dissolved in methanol (500 ml.) and boiled under reflux for 2 hours. Most of the solvent was removed (rotary evaporator), and then aqueous sodium hydrogen carbonate was added. The white precipitated solid was filtered off, washed with water, and dried to give the 4-chlorometyhlthiazole (34.6 g.).

The chloromethylthiazole (30.7 g.) was heated on a steam bath with potassium cyanide (18.0 g.) ethanol (68 mls.) and water (23 mls.) for 4 hours. The mixture was evaporated to near dryness and poured into excess water. The resulting oil was extracted into ether, washed well with water, then saturated aqueous sodium chloride and evaporated to give the nitrile as a dark red gum (19.1 g.).

The crude nitrile was suspended in 6 N hydrochloric acid (200 ml.) and boiled under reflux 1½ hours. On cooling, the crystals which had formed were filtered off, washed once with water and dissolved in sodium hydroxide solution. The solution was treated with charcoal, filtered, and the filtrate acidified to pH 3 with hydrochloric acid. The oil formed, was extracted into ether, dried (MgSO$_4$) and evaporated to give a crystalline solid.

2-phenylthiazol-4-ylacetic acid was recrystallized from benzene/petrol (60–80° C.) to give needle crystals, M.P. 90–91° C. Yield—25.7 g.

The acid (4.4 g.) was converted to the acetoxymethyl ester by reaction with triethylamine (2.8 mls.) in dimethylformamide (30 mls.) followed by reaction with acetoxymethyl bromide (2.0 ml.). The product was poured into water, extracted with ether, washed, dried and evaporated to give an oil which was distilled. Yield 4.0 g. (76.5%); B.P. 150–160° C./0.1 mm.

*Analysis.*—Found (percent): C, 57.65; H, 4.5; N, 5.0; S, 10.9. C$_{14}$H$_{13}$NO$_4$S requires (percent) C, 57.7; H, 4.5; H, 4.8; S, 11.0.

The acetoxymethyl bromide may be prepared by heating the acyl halide, e.g., the bromide, and paraformaldehyde in the presence of anhydrous zinc halide followed by distillation.

What is claimed is:
1. Acetoxymethyl 2-phenylthiazol-4-ylacetate.

References Cited
UNITED STATES PATENTS
2,423,709    7/1947   Knott _____ 260—302

ALEX MAZEL, Primary Examiner
R. J. GALLAGHER, Assistant Examiner

U.S. Cl. X.R.
260—488; 424—270